United States Patent
Higa et al.

(10) Patent No.: US 6,944,633 B1
(45) Date of Patent: Sep. 13, 2005

(54) PERFORMING A JOIN IN A PARTITIONED DATABASE SYSTEM

(75) Inventors: Lawrence H. Higa, Los Angeles, CA (US); Paul L. Sinclair, Manhattan Beach, CA (US); Mark William Sirek, San Diego, CA (US); Kuorong Chiang, Cerritos, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/732,393

(22) Filed: Dec. 10, 2003

(51) Int. Cl.[7] ............................................. G06F 17/30
(52) U.S. Cl. ................... 707/104.1; 707/100; 707/101; 707/3; 707/2
(58) Field of Search ........................... 707/2, 102, 100, 707/101, 1, 3, 201, 104.1

(56) References Cited

U.S. PATENT DOCUMENTS

| | | | | |
|---|---|---|---|---|
| 5,241,648 A * | 8/1993 | Cheng et al. | ................... | 707/7 |
| 5,551,031 A * | 8/1996 | M. Cheng et al. | .............. | 707/2 |
| 5,557,791 A * | 9/1996 | Cheng et al. | ................... | 707/2 |
| 5,742,806 A * | 4/1998 | Reiner et al. | ................... | 707/3 |
| 5,983,215 A * | 11/1999 | Ross et al. | ...................... | 707/2 |
| 6,226,639 B1 * | 5/2001 | Lindsay et al. | ................ | 707/5 |
| 6,253,197 B1 * | 6/2001 | Lindsay et al. | ................ | 707/3 |
| 6,289,334 B1 * | 9/2001 | Reiner et al. | ................... | 707/3 |
| 6,453,314 B1 * | 9/2002 | Chan et al. | .................... | 707/3 |
| 6,505,189 B1 * | 1/2003 | On Au et al. | ................... | 707/2 |
| 6,665,684 B2 * | 12/2003 | Zait et al. | ................... | 707/102 |

* cited by examiner

Primary Examiner—Jean M. Corrielus
(74) Attorney, Agent, or Firm—Baker Botts LLP; John D. Cowart

(57) ABSTRACT

A method of performing a join includes identifying a join that identifies a first table and a second table. The first table includes a plurality of first table rows. Each of the plurality of first table rows are grouped into one of a plurality of first table partitions. The second table includes one or more second table rows. Each of the plurality of second table rows are grouped into one or more second table partitions. A determination is made as to whether the first table and the second table are joined on equality constraints. The one or more first table rows are joined with the one or more second table rows using a rowkey merge join where equality exists.

24 Claims, 5 Drawing Sheets

PERFORMING A JOIN IN A PARTITIONED DATABASE SYSTEM

BACKGROUND

Data organization is important in relational database systems that deal with complex queries against large volumes of data. Relational database systems allow data to be stored in tables that are organized as both a set of columns and a set of rows. Standard commands are used to define the columns and rows of tables and data is subsequently entered in accordance with the defined structure. The defined table structure is logically maintained, but may not correspond to the physical organization of the data. For example, the data corresponding to a particular table may be split up among a number of physical hardware storage facilities.

Many users of relational database systems desire fast execution of complex queries against large amounts of data. Different physical types of storage, for example random access memory and hard drives, can incur different length delays. In addition, writing to memory or a hard drive is often slower than reading an equivalent amount of data from memory or a hard drive. The organization of data corresponding to tables defined in a relational database system may determine the number of writes and reads that are performed in order to execute a common query. If the data is properly organized, in responding to queries performance can be improved by taking advantage of that organization and searching only part of the data. If the data is not organized in any way, it will often need to be searched in its entirety to satisfy a query or copied and restructured into a useful organization.

Given a particular change in the organization of data, particular types of searches or other operations performed on the data may be adversely impacted in terms of efficiency if they are performed without any adjustment. Many factors must be addressed to adjust a search that is to be performed with respect to a new organization of data. Such factors include, but are not limited to, the manner in which the data is stored, the file system that identifies the location of the data and various other information about the data, and the desired outcome of the search. Failure to consider and address any one of those factors can result in an inefficient search.

SUMMARY

In general, in one aspect, the invention features a method for performing a join that includes identifying a join that identifies a first table and a second table. The first table includes a plurality of first table rows. Each of the plurality of first table rows are grouped into one of a plurality of first table partitions. The second table includes one or more second table rows. Each of the plurality of second table rows are grouped into one or more second table partitions. A determination is made as to whether the first table and the second table are joined on equality constraints. The one or more first table rows are joined with the one or more second table rows using a rowkey merge join where equality exists.

Implementations of the invention may include one or more of the following. Determining that the first table and the second table are joined on equality constraints may include determining that the join specifies an equality constraint between each primary index column of the first table and a primary index column of the second table and determining that the join specifies an equality constraint between each partitioning column of the first table and a partitioning column of the second table. The method may further include identifying a first partition expression associated with the first table and a second partition expression associated with the second table and determining that a first partition expression is equivalent to the second partition expression. Determining that the first partition expression is equivalent to the second partition expression may include determining that the number of first table partitions is equivalent to the number of the second table partitions. Joining the one or more first table rows with the one or more second table rows using the rowkey merge join may include identifying a rowkey associated with a first qualifying row in the first table and determining whether the rowkey associated with the first row in the first table matches a rowkey associated with a row in the second table. If the rowkey associated with the first row in the first table matches a rowkey associated with a row in the second table, the row in the second table and the first row from the first table may be joined and the next qualifying sequential row in the second table selected. Otherwise, the next qualifying sequential row in the second table may be selected. Using the rowkey merge join may further include identifying a rowkey associated with the next qualifying sequential row in the second table and determining whether the rowkey associated with the next qualifying sequential row in the second table matches a rowkey associated with a row in the first table. If the rowkey associated with the next qualifying sequential row in the second table matches a rowkey associated with a row in the first table, the next qualifying sequential row in the second table and the row from the first table may be joined and the next qualifying sequential row in the first table selected. Otherwise, the next qualifying sequential row in the first table may be selected. The steps may be repeated until each qualifying row in the first table and each qualifying row in the second table is considered.

In general, in another aspect, the invention features a method for performing a join that includes identifying a join that identifies a first table and a second table. The first table includes a plurality of first table rows. Each of the plurality of first table rows are grouped into one of a plurality of first table partitions based on a partitioning expression applied to one or more partitioning columns of the first table. The second table includes a plurality of second table rows. A determination is made as to whether the join specifies equality constraints between each primary index column of the first table and a column of the second table. A determination is made as to whether the join specifies equality constraints between each partitioning column of the first table and a column of the second table. The second table is sorted into a plurality of second table partitions based on the partitioning expression of the first table applied to the columns of the second table that correspond with each partitioning column of the first table. Each of the plurality of second table rows are grouped into one of the plurality of second table partitions. The one or more first table rows are joined with the one or more second table rows using a rowkey merge join where equality exists.

Implementations of the invention may include one or more of the following. A spool may be generated for the second table. Sorting the second table into the plurality of second table partitions may include sorting the spool into the plurality of second table partitions based on the partitioning expression of the first table applied to the columns of the second table that correspond with each partitioning column of the first table. A determination may be made as to whether the one or more primary index columns of the first table does not match the corresponding one or more primary index columns of the second table. Where such a determination is made, the plurality of second table rows may then be redistributed based on the one or more columns of the second table that correspond with each primary index column of the first table. The plurality of second table rows are redistributed prior to sorting the second table into a plurality of second table partitions. The plurality of second table rows may be sorted within each of the plurality of second table partitions based on a hash value.

In general, in another aspect, the invention features a database management system that includes a massively parallel processing system. The system includes one or more nodes and a plurality of processors. Each of the one or more nodes provides access to one or more processors. The system also includes a plurality of virtual processes. Each of the one or more processors provides access to one or more virtual processes. The system also includes a set of one or more database tables residing on the one or more nodes. The one or more database tables contain information organized by geographic location. The one or more of the plurality of virtual processes are operable to identify a join that identifies a first table and a second table. The first table including a plurality of first table rows. Each of the plurality of first table rows are grouped into one of a plurality of first table partitions. The second table includes one or more second table rows. Each of the plurality of second table rows are grouped into one or more second table partitions. The plurality of virtual processors are operable to determine that the first table and the second table are joined on equality constraints and join the one or more first table rows with the one or more second table rows using a rowkey merge join where equality exists.

In general, in another aspect, the invention features a database management system that includes a massively parallel processing system. The system includes one or more nodes and a plurality of processors. Each of the one or more nodes provides access to one or more processors. The system also includes a plurality of virtual processes. Each of the one or more processors provides access to one or more virtual processes. The system also includes a set of one or more database tables residing on the one or more nodes. The one or more database tables contain information organized by geographic location. The one or more of the plurality of virtual processes are operable to identify a join that identifies a first table and a second table. The first table includes a plurality of first table rows. Each of the plurality of first table rows are grouped into one of a plurality of first table partitions based on a partitioning expression applied to one or more partitioning columns of the first table. The second table includes a plurality of second table rows. The one or more of the plurality of virtual processes are operable to determine that the join specifies equality constraints between each primary index column of the first table and a column of the second table and determine that the join specifies equality constraints between each partitioning column of the first table and a column of the second table. The one or more of the plurality of virtual processes are operable to sort the second table into a plurality of second table partitions based on the partitioning expression of the first table applied to the columns of the second table that correspond with each partitioning column of the first table. Each of the plurality of second table rows grouped into one of the plurality of second table partitions. The one or more of the plurality of virtual processes are operable to join the one or more first table rows with the one or more second table rows using a rowkey merge join where equality exists.

In general, in another aspect, the invention features a system for updating an index in a database that includes logic encoded on at least one computer readable medium. The logic is operable when executed to identify a join that identifies a first table and a second table. The first table includes a plurality of first table rows. Each of the plurality of first table rows are grouped into one of a plurality of first table partitions. The second table includes one or more second table rows. Each of the plurality of second table rows are grouped into one or more second table partitions. The logic is operable to determine whether the first table and the second table are joined on equality constraints and join the one or more first table rows with the one or more second table rows using a rowkey merge join where equality exists.

In general, in another aspect, the invention features a system for updating an index in a database that includes logic encoded on at least one computer readable medium. The logic is operable when executed to identify a join that identifies a first table and a second table. The first table includes a plurality of first table rows. Each of the plurality of first table rows are grouped into one of a plurality of first table partitions based on a partitioning expression applied to one or more partitioning columns of the first table. The second table includes a plurality of second table rows. The logic is operable to determine whether the join specifies equality constraints between each primary index column of the first table and a column of the second table and determine whether the join specifies equality constraints between each partitioning column of the first table and a column of the second table. The logic is operable to sort the second table into a plurality of second table partitions based on the partitioning expression of the first table applied to the columns of the second table that correspond with each partitioning column of the first table. Each of the plurality of second table rows are grouped into one of the plurality of second table partitions. The logic is operable to join the one or more first table rows with the one or more second table rows using a rowkey merge join where equality exists.

Other features and advantages will become apparent from the description and claims that follow.

DETAILED DESCRIPTION

Figure 1:
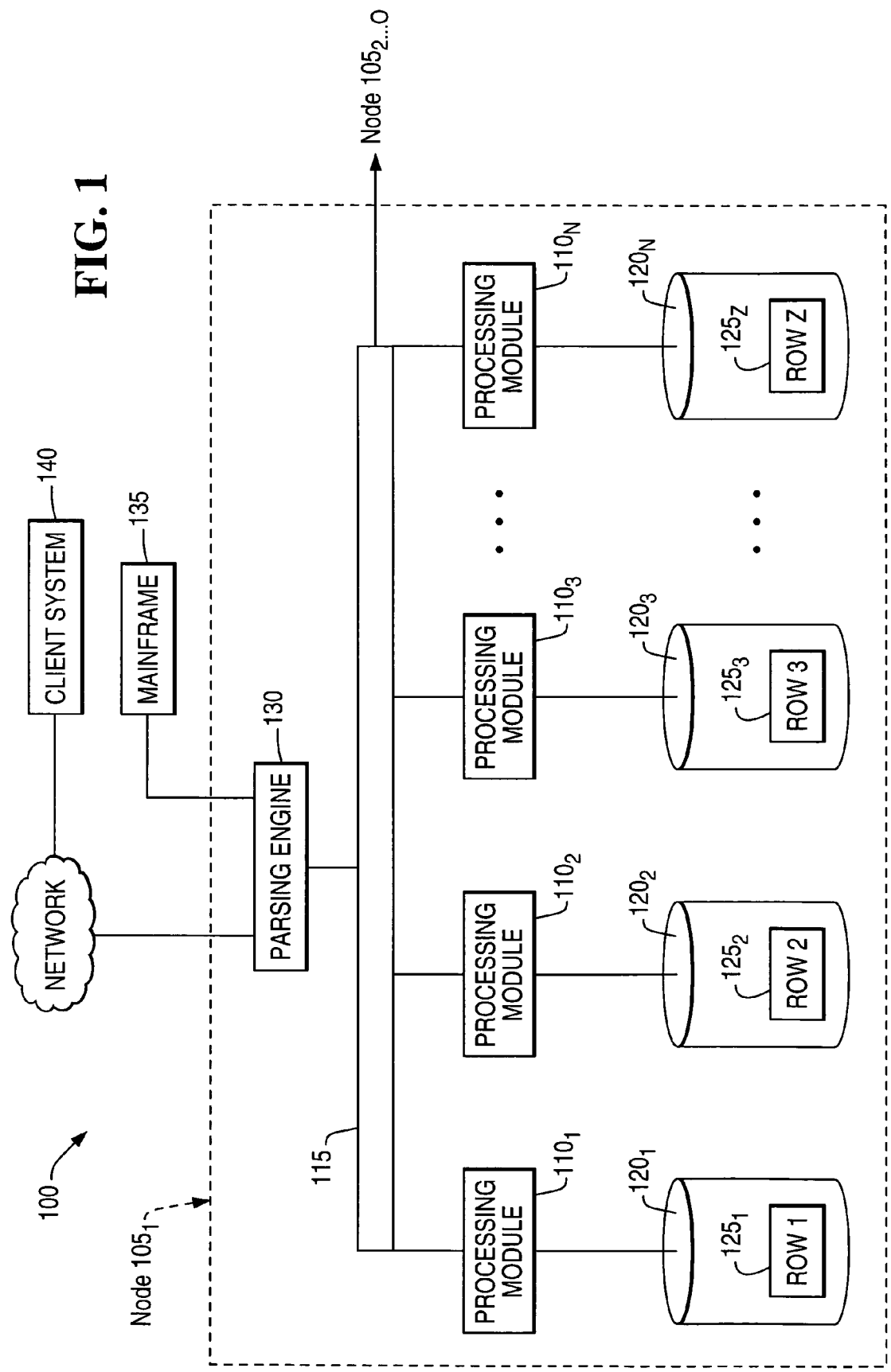
FIG. 1 is a block diagram of a node of a database system.

The join technique for a partitioned table disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_1 \ldots _N$ manages a portion of a database that is stored in a corresponding one of the data-storage facilities $120_1 \ldots _N$. Each of the data-storage facilities $120_1 \ldots _N$ includes one or more disk drives. The DBS may include multiple nodes $105_2 \ldots _N$ in addition to the illustrated node $105_1$, connected by extending the network 115.

The system stores data in one or more tables in the data-storage facilities $120_1 \ldots _N$. The rows $125_1 \ldots _Z$ of the tables are stored across multiple data-storage facilities $120_1 \ldots _N$ to ensure that the system workload is distributed evenly across the processing modules $110_1 \ldots _N$. A parsing engine 130 organizes the storage of data and the distribution of table rows $125_1 \ldots _Z$ among the processing modules $110_1 \ldots _N$. The parsing engine 130 also coordinates the retrieval of data from the data-storage facilities $120_1 \ldots _N$ in response to queries received from a user at a mainframe 135 or a client computer 140. The DBS 100 usually receives queries and commands to build tables in a standard format, such as SQL.

In one implementation, the rows $125_1 \ldots _Z$ are distributed across the data-storage facilities $120_1 \ldots _N$ by the parsing engine 130 in accordance with their primary index. The primary index defines the one or more columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_1 \ldots _N$ and associated processing modules $110_1 \ldots _N$ by a hash bucket map. The characteristics of the columns chosen for the primary index determine how evenly the rows are distributed.

Figure 2:
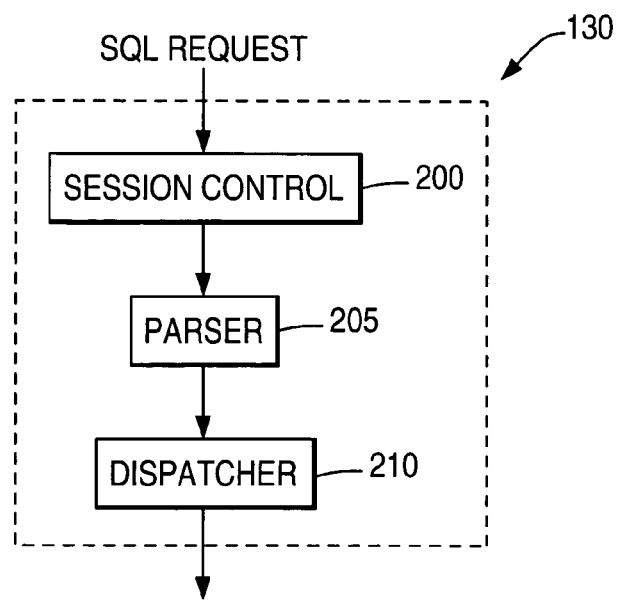
FIG. 2 is a block diagram of a parsing engine.

In an example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
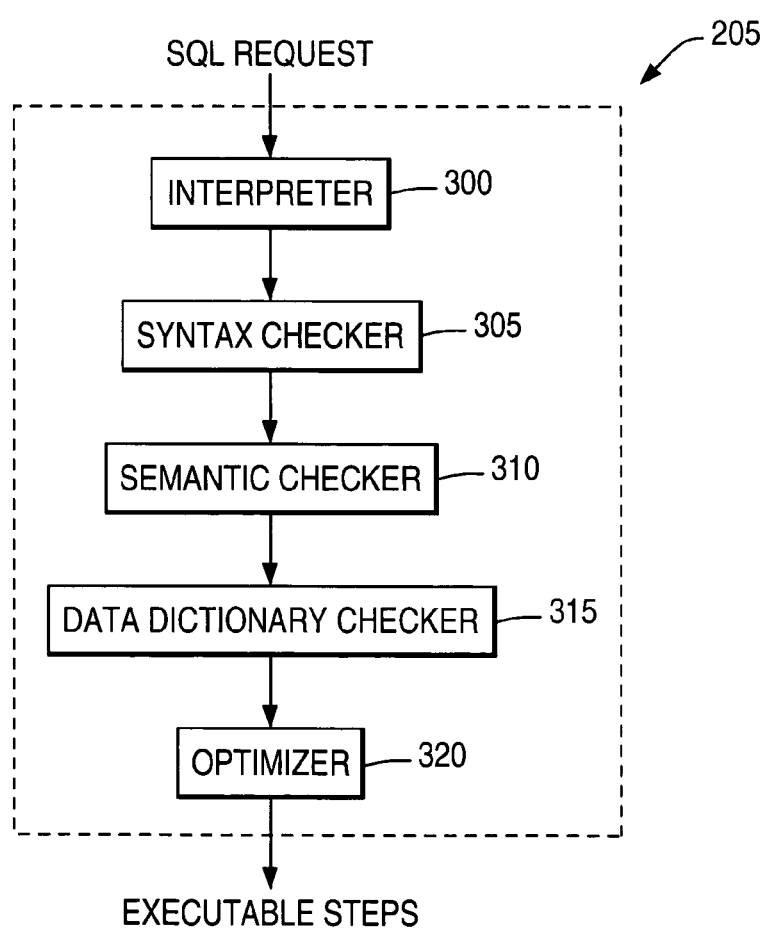
FIG. 3 is a flowchart of a parser.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops the least expensive plan to perform the request.

Figure 4:
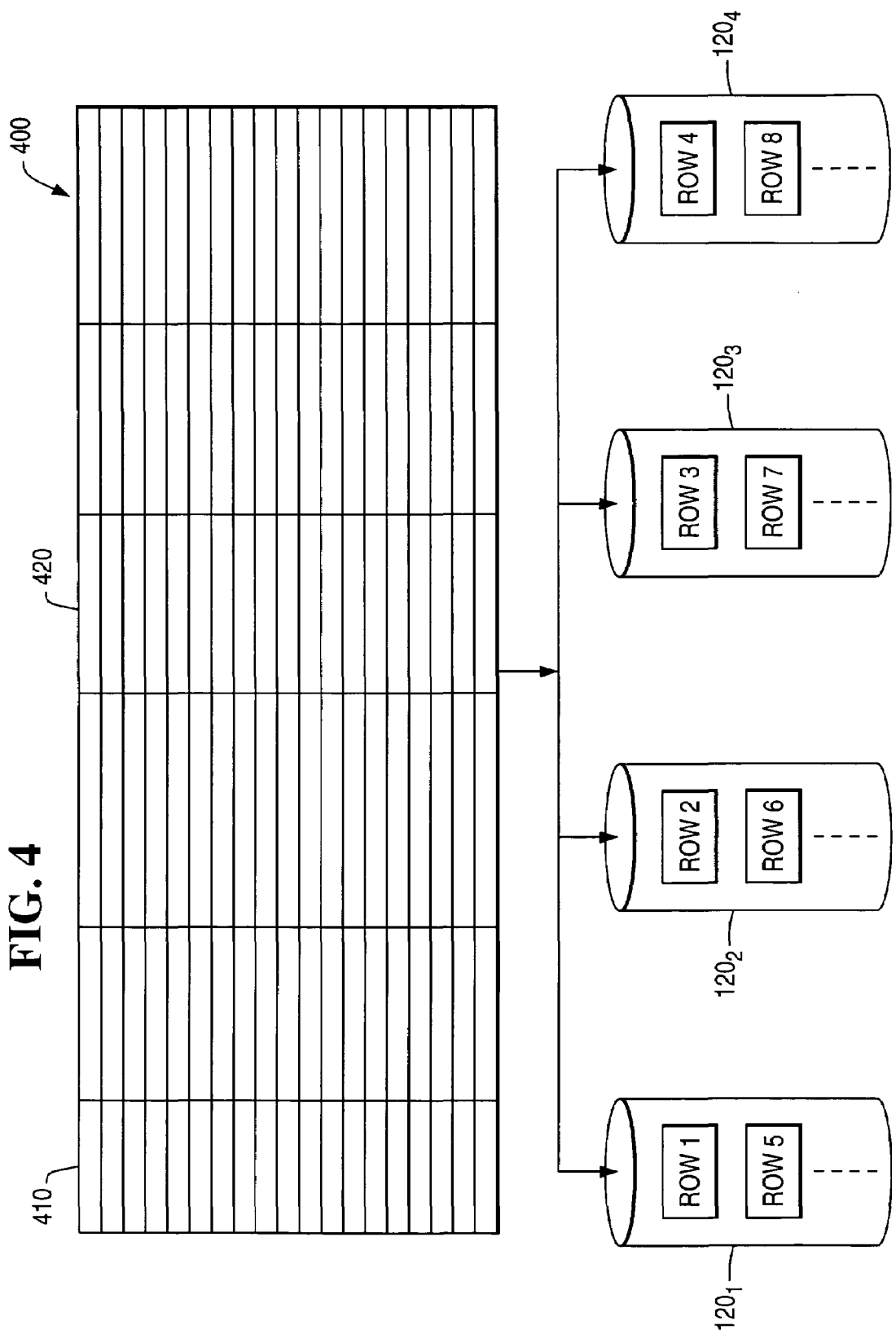
FIG. 4 is a flow diagram of a table distribution process.

FIG. 4 shows one implementation of how the rows of a table are distributed. The table 400 contains a plurality of rows and is stored in a plurality of data storage facilities $120_{1-4}$ by processing module 110 under the direction of parsing engine 130, as shown in FIG. 1. For example, two columns 410, 420 can be designated as the primary index when the table is created. The hash function is then applied to the contents of columns 410, 420 for each row. The hash bucket portion of the resulting hash value is mapped to one of the data storage facilities $120_{1-4}$ and the row is stored in that facility. For example, if the primary index indicates a column containing a sequential row number and the hash function is the sum of the value one and the remainder when the sequential row number is divided by four, the first eight rows will be distributed as shown in FIG. 4.

Queries involving the values of columns in the primary index can be efficiently executed because the processing module lion having access to the data storage facility $120_n$ that contains the row can be immediately determined. For example, referring to FIG. 4, if values from row 2 are desired, the parsing engine 130 can apply the hashing function to determine that only processing module $110_2$ needs to be used. As another example, an equality join between two tables that have the same primary index columns is more efficient at least in the sense that all of the rows that need to be joined are found in the same data storage facility $120_n'$ and no movement of information between the facilities is necessary.

Figure 5:
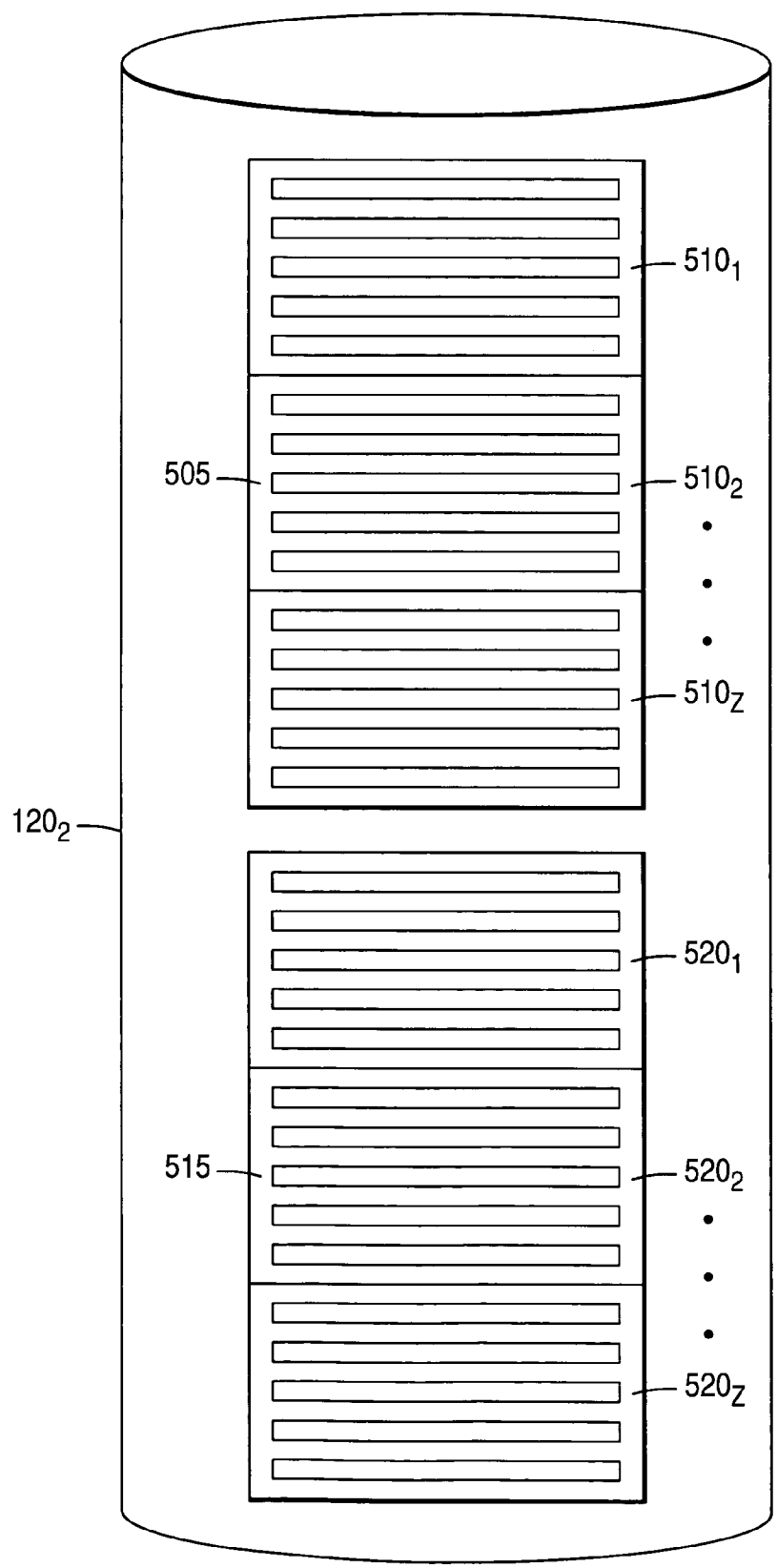
FIG. 5 illustrates an example of rows from two partitioned tables residing in a data storage facility.

While the primary index of a table can be chosen for equality joins, for example the order number column of an order table, additional design features can make range searches, for example a range of dates from the date column, more efficient. Referring to FIG. 5, a partitioned database storage facility $120_2$ is shown. Rows from two partitioned tables 505 and 540 are organized within the storage facility $120_2$ in accordance with a row identification (row ID), which can include values associated with a partition function as well as values associated with the hash function and a uniqueness value. The rows stored in each table 505 and 540 in storage facility $120_2$ are ordered at a top level by the result of the partition function. As a result, partitioned table 505 includes at least two groups of rows $510_{1-Z}$. Specifically, partitioned table 505 is illustrated as including a first group of rows $510_1$ having one partition function value, a second group of rows $510_2$ having another partition function value, and a third group of rows $510_3$ having a third partition value. The groups of rows $510_{1-Z}$ are ordered by their partition values and are also known as partitions.

Partitioned table 515 is illustrated as being similar to table 505. Accordingly, table 515 is illustrated as including at least two groups of rows $520_{1-Z}$. Specifically, partitioned table 515 is illustrated as including a first group of rows $520_1$ having one partition function value, a second group of rows $520_2$ having another partition function value, and a third group of rows $520_3$ having a third partition value. The groups of rows $520_{1-Z}$ are ordered by their partition values and are also known as partitions. Although table 515 is shown as a partitioned table, table 515 need not include a partitioned table. Accordingly, in various implementations that will be described in more detail below, table 515 may include a single group of rows 520 that is not partitioned.

Where tables 505 and 515 are partitioned tables, the rows are also sorted within each partition. For example, the first partition $510_1$ contains five rows. Those rows are stored within that partition $510_1$ in the order of the hash result for each row. The hash result therefore acts as a sorting value. A uniqueness value may also be maintained for each row. In one implementation, no two rows with the same partition and hash value in a table can have the same uniqueness value. The uniqueness values are determined when the rows are added to the table. For example, a sequential number (the next uniqueness number after the highest one currently being used) or any currently unused number can be used as the uniqueness value. If two rows are in the same partition and have the same hash value, their order is determined by their uniqueness values, which by definition cannot be identical. The uniqueness value does not play a role in ordering rows that have different partition or hash values. In another implementation, uniqueness values are not assigned to the rows and the order of rows with identical hash values is not determined. Since rows are ordered first by partition and then by hash value, all rows with the same hash value may not be together. Rows with the same hash value may occur in multiple partitions.

A partition function can return a number for a row based on the range of values into which that row's value in a certain column falls. For example, if an order table in a database has the order number column as that table's primary index, the partition function can correspond to the month of the order date. In that situation, the rows of the order table would be distributed to storage facilities based on the result of applying the hash function to the order number. In each storage facility, the rows would be ordered based on a monthly range of dates. For example, the first partition $510_1$ could include all rows for orders in January 2001. The second partition $510_2$ could include all rows for orders in February 2001. Within each partition the rows are in the order of the hash value and, where hash values are the same, in order by uniqueness value. Such a partitioned table could be efficiently searched on ranges by eliminating partitions from the required search. For example, if all orders for a certain product during a two month period are desired, only two partitions would need to be checked for the specified product. The monthly range is just one example of a possible partition function. Any type of function can be used.

For one implementation of joining two tables or other data structures in a DBS 100, rows from table 505 may be joined with rows from table 515. Since rows stored in data storage facility $120_2$ are ordered first by partition and then by hash value for each table 505 and 515, all rows with the same hash value may not be together within each partition $510_{1-Z}$ and $520_{1-Z}$. Rows with the same hash value may occur in multiple partitions within data storage facility $120_2$. Because rows with the same hash value may occur in multiple partitions, the queries performed to join a partitioned table with another table (that may or may not be partitioned) may be more complicated than the queries performed to join two tables that are not partitioned.

For example, when joining rows from tables 505 and 515 with a particular hash value, the one or more processing modules 110 performing the query under the direction of parsing engine 130 may determine whether a first partition $510_1$ includes one or more rows with the particular hash value. The processing module 110 then sequentially searches in partitions $520_{1-Z}$ for rows with matching hash values. The processing module 110 then determines whether second partition $510_2$ includes one or more rows with the particular hash value and again sequentially searches partitions $520_{1-Z}$ for rows with matching hash values. This analysis is performed for each partition $510_{1-Z}$ storing rows associated with the tables 505 and 515 specified in the join. As a result, each partition $520_{1-Z}$ may be read multiple times for each join performed, and the join of partitioned tables 505 and 515 results in the inefficient duplication of the steps performed by processing module 110.

The performance of joins of partitioned tables may be improved, however, when certain conditions are present. For example, performance of the join may be improved where there are equality conditions on both the primary index and partitioning columns of tables 505 and 515. Equality conditions may exist where the two tables are partitioned in a same or similar manner. For example, where tables 505 and 515 are partitioned in same or similar manner, parser 130 need not consider each partition $520_{1-Z}$ when joining tables 505 and 515.

For one implementation of joining partitioned tables 505 and 515, assume that tables 505 and 515 are partitioned in the same manner. Thus, the partitioning column for tables 505 and 515 are equal. As a result, the number of partitions $510_{1-Z}$ associated with table 505, as defined by the partitioning expression, is the same as the number of partitions $520_{1-Z}$ associated with table 515, as defined by the partitioning expression. The actual physical number of partitions associated with tables 505 and 515, however, may vary as some partitions within table 505 and/or table 515 may be empty. Assume, for example, that tables 505 and 515 may each have twelve partitions $510_{1-12}$ and $520_{1-12}$, respectively. For a particular implementation, each of the twelve partitions may correspond with the twelve months of 2003. Because tables 505 and 515 are partitioned the same, first partition $510_1$ corresponds with first partition $520_1$, second partition $510_2$ corresponds with second partition $520_2$, and so on. For example, where first partition $510_1$, second partition $510_2$, and third partition $510_3$ includes all rows for orders submitted in January 2001, February 2001, and March 2001, respectively, first partition $520_1$, second partition $520_2$, and third partition $520_3$ also includes rows for orders submitted in January 2001, February 2001, and March 2001, respectively. In this example, the partitioning expression used to partition the rows of tables 505 and 515 is the months of the year.

Because tables 505 and 515 are partitioned the same, tables 505 and 515 may be joined using a rowkey merge join. A rowkey merge join may be performed using row hash match scan. Instead of merge joining table 505 and 515 based on the hash of the primary index, however, the rowkey merge join joins table 505 and table 515 based both on the partition number and the hash value of the primary index. The partition number and the hash value are in the rowid of a row for a partitioned table, and the combination of the partition number and the hash value may be referred to as the rowkey. The rowkey is the subpart of the rowid that does not include the uniqueness value.

To execute the rowkey merge join, parser 130 may direct processing module 110 to select a row from table 505 and identify the rowkey associated with the row. Processing module 110 may then scan table 515, to look for a matching rowkey. Because table 515 is sorted by rowkey, processing module 110 may easily determine whether the matching rowkey is present in table 515. Where processing module 110 locates the matching rowkey, the rows from tables 505 and 515 that correspond with the matching rowkeys may be joined. Regardless of whether processing module 110 identifies a matching rowkey, the next sequential rowkey may be selected from table 515. Processing module 110 may then scan table 505 to determine whether a matching rowkey is identified in table 505. In this manner, processing module 110 under the direction of parser 130 may "ping pong" back in forth between table 505 and 515 joining rows with matching rowkeys. The rowkey merge join enables equivalently partitioned tables 505 and 515 to be joined more efficiently since non-matching rows are skipped within each table by processing module 110.

In another implementation, the rowkey merge join may be used where table 515 is not partitioned or is partitioned differently from table 505. The rowkey merge join may be used where table 515 may be retrieved into a partitioned primary index spool. Retrieving the partitioned primary index spool may include redistributing and sorting a copy of table 515 such that the spool is partitioned equivalently to table 505. Accordingly, where the join specifies equality constraints between the primary index column of table 505 and one or more columns of table 515, a spool of table 515 may be generated. The spool may then be sorted into a plurality partitions $520_{1-z}$ resulting in partitioned table 515. Thus, partitioned table 515 may be created from a sorted spool of the table to be joined with table 505. The partitioning expressions, as well as the partitioning numbers, of tables 505 and 515 are equivalent.

The created partitioned table 515 may be partitioned based on the partitioning expression of table 505 applied to the columns of table 505 that correspond with each partitioning column of table 505. For example, where table 505 includes twelve partitions $510_{1-12}$ that correspond with each month in 2001, table 515 may be sorted into twelve partitions $520_{1-12}$ that are equivalent to partitions $510_{1-12}$. Where table 515 includes rows relating to orders submitted from July of 2001 through of June 2002, however, not every partition $520_{1-12}$ generated for table 515 will correspond with a partition $510_{1-12}$ of table 505. Similar to above, for the described example, partitions $510_{7-12}$ of table 505 correspond with partitions $520_{1-6}$ of table 515.

Because the partitions of the spooled table 515 are the equivalent of the partitions of table 505, the rowkey merge may be performed as was described above. Thus, at the direction of parser 130, processing module 110 may "ping pong" back in forth between tables 505 and 515 joining rows with matching rowkeys. In this implementation, the rowkey merge join enables equivalently partitioned table 505 and spooled table 515 to be joined more efficiently since non-matching rows are skipped within each table by processing module 110.

Figure 6:
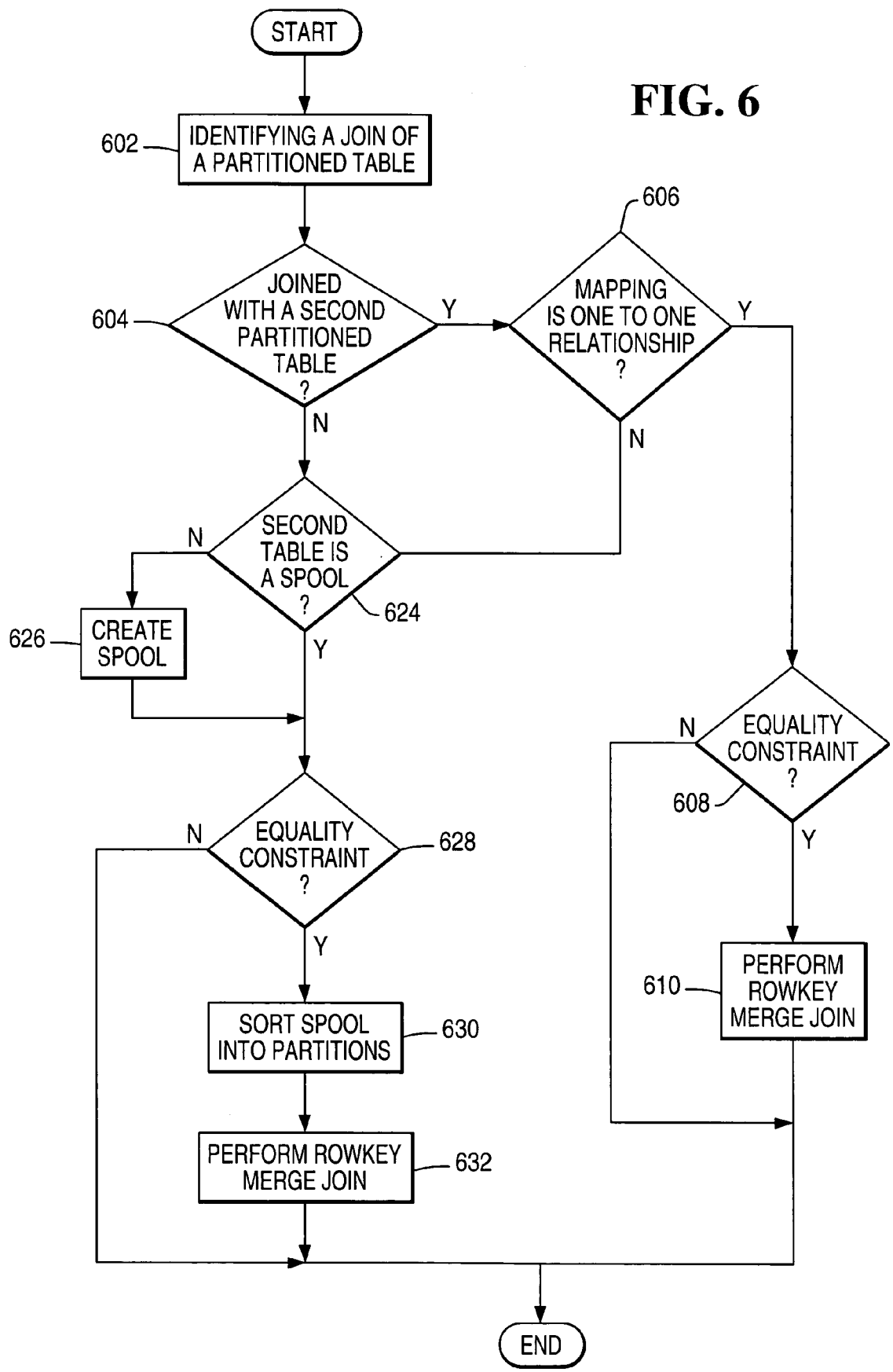
FIG. 6 illustrates a flowchart of an example method for joining a partitioned table with another table.

FIG. 6 illustrates a flowchart of an example method for joining a partitioned table 505 with another table 515. At step 602, a join is identified that specifies a first table 505 and a second table 515. First table 505 includes multiple first table rows. Each of the first table rows is grouped into one of a plurality of first table partitions 510. At step 604, a determination is made as to whether second table 515 is a partitioned table. If second table 515 is a partitioned table, second table 515 also includes one or more second table rows. Each of the second table rows is grouped into one or more second table partitions 520. If second table 515 is a partitioned table, a determination is made at step 606 as to whether first table partitions 510 map to second table partitions 520 in a one to one relationship.

If it is determined at step 606 that the relationship between first table partitions 510 and second table partitions 520 is not a one to one relationship, the method continues at step 624, which will be described below. Otherwise, a determination at step 608 is made as to whether first table 505 and second table 515 are joined on equality constraints. Determining whether first table 505 and second table 515 are joined on equality constraints may include identifying a first partition expression associated with first table 505 and a second partition expression associated with second table 515. First and second tables 505 and 515 may be joined on equality constraints if the first and second partition expressions are equivalent. The partition expressions may be equivalent where the number of first table partitions 510 is equal to the number of second table partitions 520.

If it is determined at step 608 that first table 505 and second table 515 are joined on equality constraints, the one or more first table rows are joined with the one or more second table rows using a rowkey merge join at step 610. Performing the rowkey merge join may include comparing a partition and a rowhash associated with the one or more first table rows with a partition and a rowhash associated with the one or more second table rows for equality. Where equality exists, the one or more first table rows may be joined with the one or more second table rows. Upon performing the rowkey merge join, the method terminates.

Returning to steps 604 and 606, if it is determined at step 604 that second table 515 is not a partitioned table or at step 606 that the relationship between first table partitions 510 and second table partitions 520 is not a one to one relationship, a further determination is made at step 624 as to whether second table 515 is a spool. If second table 515 is not a spool, a spool is created at step 626. Creating a spool of table 515 may include copying table 515 so that the copy may be manipulated. At step 628, a determination is made as to whether first table 505 and second table 515 are joined on equality constraints between a primary index column of first table 505 and one or more columns of second table 515. If first table 505 and second table 515 are not joined on equality constraints, the method terminates. Otherwise, the method continues to step 630.

At step 630, the spool of second table 515 is sorted into partitions 520. The spool of second table 515 may be sorted into partitions 520 based on the partitioning expression of first table 505 applied to the columns of second table 515 that correspond with each partitioning column of first table 505. Within each partition 520, the rows of the spool of second table 515 may be further sorted based on the hash value associated with each row. Accordingly, each of the rows in the spool may be grouped into a second table partition 520. At step 632, the one or more first table rows are joined with the one or more second table rows where equality exists using a rowkey merge join. The rowkey merge join may be performed by comparing a partition and a rowhash associated with the one or more first table rows with a partition and a rowhash associated with the one or more second table rows for equality. Where equality exists, the one or more first table rows may be joined with the one or more second table rows. Upon performing the rowkey merge join, the method terminates.

Thus, the system and method described above permits optimized joining of a partitioned table with another table (whether or not partitioned) or a spool of an unpartitioned table. Under the described conditions, the disclosed techniques may be as efficient as applying the row hash match scan directly to a table. Additionally, the disclosed techniques may not exceed memory limitations. Since the optimizer uses a cost-based model, the optimization techniques may be costed and compared to other methods to determine the best join for the particular query. Additionally, the above described optimization techniques maximize the advantages of partitioning to improve the overall effectiveness and usefulness of the partitioning feature.

The text above describes one or more specific implementations of a broader invention. The invention is also carried out in a variety of alternative implementations and thus not limited to those directed described here. For example, while the invention has been described in terms of a database management system that uses a massively parallel processing architecture, other types of database systems and architectures, including databases having a symmetric multiprocessing architecture, are also useful in carrying out the invention. As another example, an implementation has been described with the sorting value as a hash value that is also used for distributing rows among storage facilities. Other types of sorting values are also useful in carrying out the invention. Many other implementations are also within the scope of the following claims.

What is claimed is:

1. A computer-implemented method of performing a join in a partitioned database system, the method comprising:

identifying a join that identifies a first table and a second table, the first table including a plurality of first table rows, each of the plurality of first table rows grouped into one of a plurality of first table partitions, the second table including one or more second table rows, each of the plurality of second table rows grouped into one or more second table partitions;

determining that the first table and the second table are joined on equality constraints; and joining the one or more first table rows with the one or more second table rows using a rowkey merge join where equality exists;

wherein joining the one or more first table rows with the one or more second table rows using the rowkey merge join comprises:

a) identifying a rowkey associated with a first qualifying row in the first table, the first qualifying row in the first table comprising the first row in the first table that satisfies any conditions of the join, the rowkey comprising a partition number and a rowhash associated with the first row in the first table;

b) determining whether the rowkey associated with the first row in the first table matches a rowkey associated with a row in the second table;

if the rowkey associated with the first row in the first table matches a rowkey associated with a row in the second table;

joining the row in the second table and the first row from the first table;

selecting the next qualifying sequential row in the second table; and otherwise, selecting the next qualifying sequential row in the second table;

c) identifying a rowkey associated with the next qualifying sequential row in the second table;

d) determining whether the rowkey associated with the next qualifying sequential row in the second table matches a rowkey associated with a row in the first table;

if the rowkey associated with the next qualifying sequential row in the second table matches a rowkey associated with a row in the first table;

joining the next qualifying sequential row in the second table and the row from the first table; and selecting the next qualifying sequential row in the first table; and otherwise, selecting the next qualifying sequential row in the first table; and e) repeating b)–d) until each qualifying row in the first table and each qualifying row in the second table is considered.

2. The method of claim 1, wherein determining that the first table and the second table are joined on equality constraints comprises:

determining that the join specifies an equality constraint between each primary index column of the first table and a primary index column of the second table; and determining that the join specifies an equality constraint between each partitioning column of the first table and a partitioning column of the second table.

3. The method of claim 1, further comprising:

identifying a first partition expression associated with the first table and a second partition expression associated with the second table; and determining that a first partition expression is equivalent to the second partition expression.

4. The method of claim 3, wherein determining that the first partition expression is equivalent to the second partition expression comprises determining that the number of first table partitions is equivalent to the number of second table partitions.

5. A computer-implemented method of performing a join in a partitioned database system, the method comprising:

identifying a join that identifies a first table and a second table, the first table including a plurality of first table rows, each of the plurality of first table rows grouped into one of a plurality of first table partitions based on a partitioning expression applied to one or more partitioning columns of the first table, the second table including a plurality of second table rows;

determining that the join specifies equality constraints between each primary index column of the first table and a column of the second table;

determining that the join specifies equality constraints between each partitioning column of the first table and a column of the second table;

sorting the second table into a plurality of second table partitions based on the partitioning expression of the first table applied to the columns of the second table that correspond with each partitioning column of the first table, each of the plurality of second table rows grouped into one of the plurality of second table partitions; and joining the one or more first table rows with the one or more second table rows using a rowkey merge join where equality exists;

wherein joining the one or more first table rows with the one or more second table rows using the rowkey merge join comprises:

a) identifying a rowkey associated with a first qualifying row in the first table, the first qualifying row in the first table comprising the first row in the first table that satisfies any conditions of the join, the rowkey comprising a partition number and a rowhash associated with the first row in the first table;

b) determining whether the rowkey associated with the first row in the first table matches a rowkey associated with a row in the second table;

if the rowkey associated with the first row in the first table matches a rowkey associated with a row in the second table, joining the row in the second table and the first row from the first table;

selecting the next qualifying sequential row in the second table; and otherwise, selecting the next qualifying sequential row in the second table;

c) identifying a rowkey associated with the next qualifying sequential row in the second table;

d) determining whether the rowkey associated with the next qualifying sequential row in the second table matches a rowkey associated with a row in the first table;

if the rowkey associated with the next qualifying sequential row in the second table matches a rowkey associated with a row in the first table, joining the next qualifying sequential row in the second table and the row from the first table; and
selecting the next qualifying sequential row in the first table; and otherwise, selecting the next qualifying sequential row in the first table; and
e) repeating steps b)–d) until each qualifying row in the first table and each qualifying row in the second table has been considered.

6. The method of claim 5, further comprising generating a spool for the second table, wherein sorting the second table into the plurality of second table partitions comprises sorting the spool into the plurality of second table partitions based on the partitioning expression of the first table applied to the columns of the second table that correspond with each partitioning column of the first table.

7. The method of claim 5, further comprising:
determining that the one or more primary index columns of the first table does not match the corresponding one or more primary index columns of the second table; and
redistributing the plurality of second table rows based on the one or more columns of the second table that correspond with each primary index column of the first table, wherein the plurality of second table rows are redistributed prior to sorting the second table into a plurality of second table partitions.

8. The method of claim 5, further comprising sorting the plurality of second table rows within each of the plurality of second table partitions based on a hash value.

9. A database management system, comprising:
a massively parallel processing system comprising:
one or more nodes;
a plurality of processors, each of the one or more nodes providing access to one or more processors: and
a plurality of virtual processes, each of the one or more processors providing access to one or more virtual processes;
a set of one or more database tables residing on the one or more nodes, the one or more database tables containing information organized by geographic location; and
one or more of the plurality of virtual processes operable to:
identify a join that identifies a first table and a second table, the first table including a plurality of first table rows, each of the plurality of first table rows grouped into one of a plurality of first table partitions, the second table including one or more second table rows, each of the plurality of second table rows grouped into one or more second table partitions;
determine that the first table and the second table are joined on equality constraints; and
join the one or more first table rows with the one or more second table rows using a rowkey merge join where equality exists;
where, when joining the one or more first table rows with the one or more second table rows using the rowkey merge join, the plurality of virtual processes are further operable to:
a) identify a rowkey associated with a first qualifying row in the first table, the first qualifying row in the first table comprising the first row in the first table that satisfies any conditions of the join, the rowkey comprising a partition number and a rowhash associated with the first row in the first table;
b) determine whether the rowkey associated with the first row in the first table matches a rowkey associated with a row in the second table;
if the rowkey associated with the first row in the first table matches a rowkey associated with a row in the second table,
join the row in the second table and the first row from the first table;
select the next qualifying sequential row in the second table; and
otherwise, select the next qualifying sequential row in the second table;
c) identify a rowkey associated with the next qualifying sequential row in the second table;
d) determine whether the rowkey associated with the next qualifying sequential row in the second table matches a rowkey associated with a row in the first table;
if the rowkey associated with the next qualifying sequential row in the second table matches a rowkey associated with a row in the first table,
join the next qualifying sequential row in the second table and the row from the first table; and
select the next qualifying sequential row in the first table; and
otherwise, selecting the next qualifying sequential row in the first table; and
e) repeat b)–d) until each qualifying row in the first table and each qualifying row in the second table is considered.

10. The system of claim 9, where, when determining that the first table and the second table are joined on equality constraints, the plurality of virtual processes is further operable to:
determine that the join specifies an equality constraint between each primary index column of the first table and a primary index column of the second table; and
determine that the join specifies an equality constraint between each partitioning column of the first table and a partitioning column of the second table.

11. The system of claim 9, wherein the plurality of virtual processes are further operable to:
identify a first partition expression associated with the first table and a second partition expression associated with the second table; and
determine that a first partition expression is equivalent to the second partition expression.

12. The system of claim 11, wherein determining that the first partition expression is equivalent to the second partition expression comprises determining that the number of first table partitions is equivalent to the number of the second table partitions.

13. A database management system, comprising:
a massively parallel processing system comprising:
one or more nodes;
a plurality of processors, each of the one or more nodes providing access to one or more processors; and
a plurality of virtual processes, each of the one or more processors providing access to one or more virtual processes;
a set of one or more database tables residing on the one or more nodes, the one or more database tables containing information organized by geographic location; and
one or more of the plurality of virtual processes operable to:
identify a join that identifies a first table and a second table, the first table including a plurality of first table rows, each of the plurality of first table rows grouped into one of a plurality of first table partitions based on a partitioning expression applied to one or more partitioning columns of the first table, the second table including a plurality of second table rows;

determine that the join specifies equality constraints between each primary index column of the first table and a column of the second table;

determine that the join specifies equality constraints between each partitioning column of the first table and a column of the second table;

sort the second table into a plurality of second table partitions based on the partitioning expression of the first table applied to the columns of the second table that correspond with each partitioning column of the first table, each of the plurality of second table rows grouped into one of the plurality of second table partitions; and join the one or more first table rows with the one or more second table rows using a rowkey merge join where equality exists;

wherein the plurality of virtual processes are further operable to join the one or more first table rows with the one or more second table rows using a rowkey merge join by:

a) identifying a rowkey associated with a first qualifying row in the first table, the first qualifying row in the first table comprising the first row in the first table that satisfies any conditions of the join, the rowkey comprising a partition number and a rowhash associated with the first row in the first table;

b) determining whether the rowkey associated with the first row in the first table matches a rowkey associated with a row in the second table;

if the rowkey associated with the first row in the first table matches a rowkey associated with a row in the second table, joining the row in the second table and the first row from the first table;

selecting the next qualifying sequential row in the second table; and otherwise, selecting the next qualifying sequential row in the second table;

c) identifying a rowkey associated with the next qualifying sequential row in the second table;

d) determining whether the rowkey associated with the next qualifying sequential row in the second table matches a rowkey associated with a row in the first table;

if the rowkey associated with the next qualifying sequential row in the second table matches a rowkey associated with a row in the first table, joining the next qualifying sequential row in the second table and the row from the first table; and selecting the next qualifying sequential row in the first table; and otherwise, selecting the next qualifying sequential row in the first table; and e) repeating b)–d) until each qualifying row in the first table and each qualifying row in the second table is considered.

14. The system of claim 13, wherein the plurality of virtual processes are further operable to generate a spool for the second table, wherein sorting the second table into the plurality of second table partitions comprises sorting the spool into the plurality of second table partitions based on the partitioning expression of the first table applied to the columns of the second table that correspond with each partitioning column of the first table.

15. The system of claim 13, wherein the plurality of virtual processes are further operable to:

determine that the one or more primary index columns of the first table does not match the corresponding one or more primary index columns of the second table; and redistribute the plurality of second table rows based on the one or more columns of the second table that correspond with each primary index column of the first table, wherein the plurality of second table rows are redistributed prior to sorting the second table into a plurality of second table partitions.

16. The system of claim 13, wherein the plurality of virtual processes are further operable to sort the plurality of second table rows within each of the plurality of second table partitions based on a hash value.

17. A system for updating an index in a database, comprising:

logic encoded on at least one computer readable medium; and the logic operable when executed to:

identify a join that identifies a first table and a second table, the first table including a plurality of first table rows, each of the plurality of first table rows grouped into one of a plurality of first table partitions, the second table including one or more second table rows, each of the plurality of second table rows grouped into one or more second table partitions;

determine that the first table and the second table are joined on equality constraints; and join the one or more first table rows with the one or more second table rows using a rowkey merge join where equality exists;

wherein, when joining the one or more first table rows with the one or more second table rows using the rowkey merge join, the logic is further operable to:

a) identify a rowkey associated with a first qualifying row in the first table, the first qualifying row in the first table comprising the first row in the first table that satisfies any conditions of the join, the rowkey comprising a partition number and a rowhash associated with the first row in the first table;

b) determine whether the rowkey associated with the first row in the first table matches a rowkey associated with a row in the second table;

if the rowkey associated with the first row in the first table matches a rowkey associated with a row in the second table, join the row in the second table and the first row from the first table;

select the next qualifying sequential row in the second table; and otherwise, select the next qualifying sequential row in the second table;

c) identify a rowkey associated with the next qualifying sequential row in the second table;

d) determine whether the rowkey associated with the next qualifying sequential row in the second table matches a rowkey associated with a row in the first table;

if the rowkey associated with the next qualifying sequential row in the second table matches a rowkey associated with a row in the first table, join the next qualifying sequential row in the second table and the row from the first table; and select the next qualifying sequential row in the first table; and otherwise, selecting the next qualifying sequential row in the first table; and e) repeat b)–d) until each qualifying row in the first table and each qualifying row in the second table is considered.

18. The logic of claim 17, wherein, when determining that the first table and the second table are joined on equality constraints, the logic is further operable to:
determine that the join specifies an equality constraint between each primary index column of the first table and a primary index column of the second table; and
determine that the join specifies an equality constraint between each partitioning column of the first table and a partitioning column of the second table.

19. The logic of claim 17, wherein the logic is further operable to:
identify a first partition expression associated with the first table and a second partition expression associated with the second table; and
determine that a first partition expression is equivalent to the second partition expression.

20. The logic of claim 19, wherein, when determining that the first partition expression is equivalent to the second partition expression, the logic is further operable to determine that the number of first table partitions is equivalent to the number of the second table partitions.

21. A system for updating an index in a database, comprising:
logic encoded on at least one computer readable medium; and
the logic operable when executed to:
identify a join that identifies a first table and a second table, the first table including a plurality of first table rows, each of the plurality of first table rows grouped into one of a plurality of first table partitions based on a partitioning expression applied to one or more partitioning columns of the first table, the second table including a plurality of second table rows;
determine that the join specifies equality constraints between each primary index column of the first table and a column of the second table;
determine that the join specifies equality constraints between each partitioning column of the first table and a column of the second table;
sort the second table into a plurality of second table partitions based on the partitioning expression of the first table applied to the columns of the second table that correspond with each partitioning column of the first table, each of the plurality of second table rows grouped into one of the plurality of second table partitions; and
join the one or more first table rows with the one or more second table rows using a rowkey merge join where equality exists;
wherein, when joining the one or more first table rows with the one or more second table rows using a rowkey merge join, the logic is further operable when executed to;
a) identify a rowkey associated with a first qualifying row in the first table, the first qualifying row in the first table comprising the first row in the first table that satisfies any conditions of the join, the rowkey comprising a partition number and a rowhash associated with the first row in the first table;
b) determine whether the rowkey associated with the first row in the first table matches a rowkey associated with a row in the second table;
if the rowkey associated with the first row in the first table matches a rowkey associated with a row in the second table,
join the row in the second table and the first row from the first table;
select the next qualifying sequential row in the second table; and
otherwise, select the next qualifying sequential row in the second table;
c) identify a rowkey associated with the next qualifying sequential row in the second table;
d) determine whether the rowkey associated with the next qualifying sequential row in the second table matches a rowkey associated with a row in the first table;
if the rowkey associated with the next qualifying sequential row in the second table matches a rowkey associated with a row in the first table,
join the next qualifying sequential row in the second table and the row from the first table; and
select the next qualifying sequential row in the first table; and
otherwise, selecting the next qualifying sequential row in the first table; and
e) repeat b)–d) until each qualifying row in the first table and each qualifying row in the second table is considered.

22. The logic of claim 21, wherein the logic is further operable when executed to generate a spool for the second table, wherein sorting the second table into the plurality of second table partitions comprises sorting the spool into the plurality of second table partitions based on the partitioning expression of the first table applied to the columns of the second table that correspond with each partitioning column of the first table.

23. The logic of claim 21, wherein the logic is further operable when executed to:
determine that the one or more primary index columns of the first table does not match the corresponding one or more primary index columns of the second table; and
redistribute the plurality of second table rows based on the one or more columns of the second table that correspond with each primary index column of the first table, wherein the plurality of second table rows are redistributed prior to sorting the second table into a plurality of second table partitions.

24. The logic of claim 21, wherein the logic is further operable when executed to sort the plurality of second table rows within each of the plurality of second table partitions based on a hash value.

* * * * *